United States Patent
Honda et al.

(10) Patent No.: US 6,807,005 B2
(45) Date of Patent: Oct. 19, 2004

(54) POLARIZER, POLARIZING LIGHT SOURCE DEVICE AND LIQUID CRYSTAL DISPLAY

(75) Inventors: Masaru Honda, Niihama (JP); Koji Higashi, Niihama (JP)

(73) Assignee: Sumitomo Chemical Company, Limited, Osaka (JP)

(*) Notice: Subject to any disclaimer, the term of this patent is extended or adjusted under 35 U.S.C. 154(b) by 195 days.

(21) Appl. No.: 09/729,860

(22) Filed: Dec. 6, 2000

(65) Prior Publication Data

US 2001/0033349 A1 Oct. 25, 2001

(30) Foreign Application Priority Data

Dec. 9, 1999 (JP) ............................................. 11-350244

(51) Int. Cl.⁷ .................................................. G02F 1/13
(52) U.S. Cl. ...................................................... 359/490
(58) Field of Search ................................ 359/490, 491, 359/492, 497

(56) References Cited

U.S. PATENT DOCUMENTS

| | | | | |
|---|---|---|---|---|
| 4,803,014 A | * | 2/1989 | Okumura et al. | 252/585 |
| 4,859,039 A | * | 8/1989 | Okumura et al. | 359/491 |
| 4,895,677 A | * | 1/1990 | Okumura et al. | 252/585 |
| 5,082,601 A | * | 1/1992 | Okada et al. | 252/585 |
| 6,096,375 A | * | 8/2000 | Ouderkirk et al. | 359/485 |
| 6,307,676 B1 | * | 10/2001 | Merrill et al. | 359/490 |
| 6,335,051 B1 | * | 1/2002 | Kausch et al. | 252/585 |

FOREIGN PATENT DOCUMENTS

| | | |
|---|---|---|
| JP | 9-189811 | 7/1997 |
| WO | 95/17691 | 6/1995 |

* cited by examiner

Primary Examiner—James A. Dudek
(74) Attorney, Agent, or Firm—Sughrue Mion, PLLC

(57) ABSTRACT

A polarizer is provided which comprises a reflection type polarizer and a dichroic polarizer, each of which is placed so that polarizing transmission axes of the reflection type polarizer and the dichroic polarizer are coincident with each other on the same optical path, wherein the dichroic polarizer has a transmittance [$T(AP)(\lambda)$] of about 44% or more and a polarizing coefficient [$P(AP)(\lambda)$] of about 50.0% or more or wherein the dichroic polarizer has a luminous correction transmittance [$Y(AP)$] of about 44% or more and a luminous correction polarizing coefficient [$P(AP, y)$] of about 50.0% or more.

17 Claims, 2 Drawing Sheets

POLARIZER, POLARIZING LIGHT SOURCE DEVICE AND LIQUID CRYSTAL DISPLAY

BACKGROUND OF THE INVENTION

1. Field of the Invention

The present invention relates to a polarizer, a polarizing light source device and a liquid crystal display.

2. Description of the Related Art

Since a liquid crystal display can be small and light, it has been used in various fields. Such a liquid crystal display (10) serves to electrically change the orientation state of liquid crystal molecules in a liquid crystal cell (20), thereby controlling the polarizing state of light transmitting through the liquid crystal cell (20). The liquid crystal cell (20) usually comprises two opposed transparent electrodes, that is, a transparent electrode (21) placed on a back face side and a transparent electrode (22) placed on a front face side, and a liquid crystal layer (23) interposed therebetween (21, 22). A front face of the liquid crystal cell (20) is provided with an optical element (30) including a dichroic polarizer (31) for detecting the polarizing state of the light transmitting through the liquid crystal cell (20), a phase retarder element (32) or the like. A back face of the liquid crystal cell (20) is provided with a polarizing light source device (40) for fetching only specific polarized light and emitting the polarized light toward the liquid crystal cell (20) constituted by an optical element (50) including a dichroic polarizer (51), a phase retarder element (52) or the like which is placed on the back face of the liquid crystal cell (20), a light transmitting plate (62) having a light source (61) provided therebelow or on the side face thereof, a reflector (63) placed on the back of the light transmitting plate (62) and a diffusion sheet (70) and/or a lens sheet (71) which are/is placed between the liquid crystal cell (20) and the light transmitting plate (62) (FIG. 2). In the polarizing light source device (40), the dichroic polarizer absorbs unnecessary polarized light, thereby functioning as a filter for transmitting only necessary polarized light. Therefore, even if the dichroic polarizer is ideal, 50% of light is absorbed based on natural light set in a non-polarizing state, so that the light cannot be utilized effectively.

Therefore, Published Japanese Translation of PCT International Application No. Hei 9-507308-A has proposed a method of placing a reflective polarizer nearer to the light source than the dichroic polarizer, thereby previously reflecting polarized light in a direction of vibration which will be absorbed by the dichroic polarizer so that the reflected polarized light returns to the light source side. In such a method, light is recycled and effectively utilized so that a luminance of a picture plane of a liquid crystal display is enhanced with consuming little electricity. This publication discloses that the reflection type polarizer and the dichroic polarizer are provided in the same optical path, preferably bounded with each other, so that an optical polarizing device having a high efficiency is obtained. Furthermore, the publication discloses that an absorbance is increased so as to reduce a reflection ratio in the optical polarizing device and an absorbance of the dichroic polarizer is reduced, so that a device having a predetermined absorbance and a high transmittance can be obtained. According to this publication, an absorbance of the dichroic polarizer is preferably from 10 to 99.99%, most preferably from 50 to 99.9%, and an absorbance of a reflection type polarizer is preferably from 20 to 99.99%, most preferably from 90 to 99.9%. However, there in no disclosure about means for further enhancing the luminances of the polarizing light source device and the liquid crystal display.

SUMMARY AND OBJECTS OF THE INVENTION

One of objects of the present invention is to utilize light furthermore effectively with a polarizer, with a polarizing light source device effectively using light by a reflection type polarizer or with a liquid crystal display which enhances the luminance of a picture plane by using the polarizing light source device.

The present inventors have found that when a polarizer comprising a reflection type polarizer and a dichroic polarizer having a specific transmittance and a specific polarizing coefficient, each of which is placed so that polarizing transmission axes of these polarizers are coincident with each other on the same optical path, is used in a polarizing light source device, a brightness of the device is more increased than that of a conventional polarizing light source device. In addition, the present inventors have found that when such a polarizing light source device is utilized in a liquid crystal display, the display has a picture quality equal to or higher than that of a conventional liquid crystal display to provide a brighter picture plane. Thus, the present invention has been accomplished.

First, the present invention provides a polarizer comprising a reflection type polarizer and a dichroic polarizer, each of which is placed so that polarizing transmission axes of the reflection type polarizer and the dichroic polarizer are coincident with each other on the same optical path, wherein the dichroic polarizer has a transmittance $[T(AP)(\lambda)]$ of about 44% or more and a polarizing coefficient $[P(AP)(\lambda)]$ of about 50.0% or more.

Secondary, the present invention provide a polarizer comprising a reflection type polarizer and a dichroic polarizer, each of which is placed so that polarizing transmission axes of the reflection type polarizer and the dichroic polarizer are coincident with each other on the same optical path, wherein the dichroic polarizer has a luminous correction transmittance $[Y(AP)]$ of about 44% or more and a luminous correction polarizing coefficient $[P(AP, y)]$ of about 50.0% or more.

Thirdly, the present invention provide a polarizing light source device comprising, in the following order, (I) one of the polarizers described above which comprise the reflection type polarizer and the dichroic polarizer, (II) a light source and (III) a reflector, wherein the light source (II) and the reflector (III) are placed over the side of surface of the reflection type polarizer in the polarizer (I).

Fourthly, the present invention provide a polarizing light source device comprising, in the following order, (I) one of the polarizers described above which comprise the reflection type polarizer and the dichroic polarizer, (II)' a light transmitting plate having a light source provided on its end and (III) a reflector, wherein the light transmitting plate (II)' and the reflector (III) are placed over the side of surface of the reflection type polarizer in the polarizer (I).

Fifthly, the present invention provide a liquid crystal display comprising, in the following order, one of polarizing light source devices described above, a liquid crystal cell and another dichroic polarizer, wherein the liquid crystal cell and the dichroic polarizer are placed over the side of surface of the dichroic polarizer used in the polarizing light source device.

DETAILED DESCRIPTION OF THE INVENTION

Figure 1:
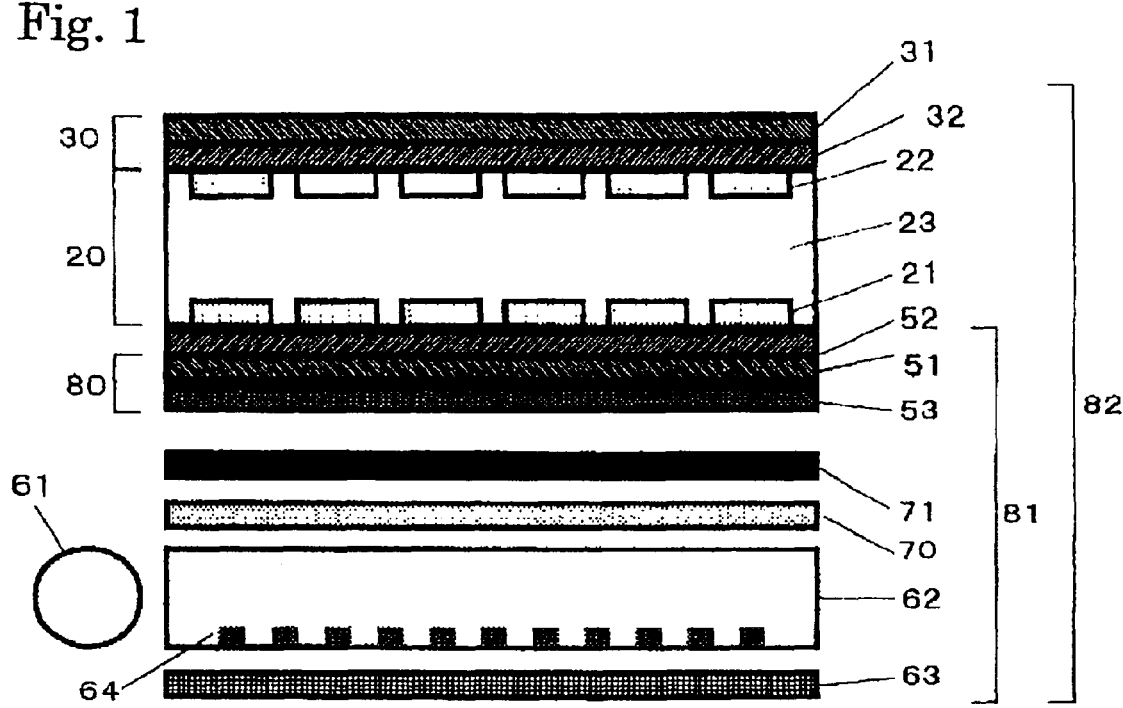
FIG. 1 is a typical sectional view showing an example of a liquid crystal display according to the present invention.
Figure 2:
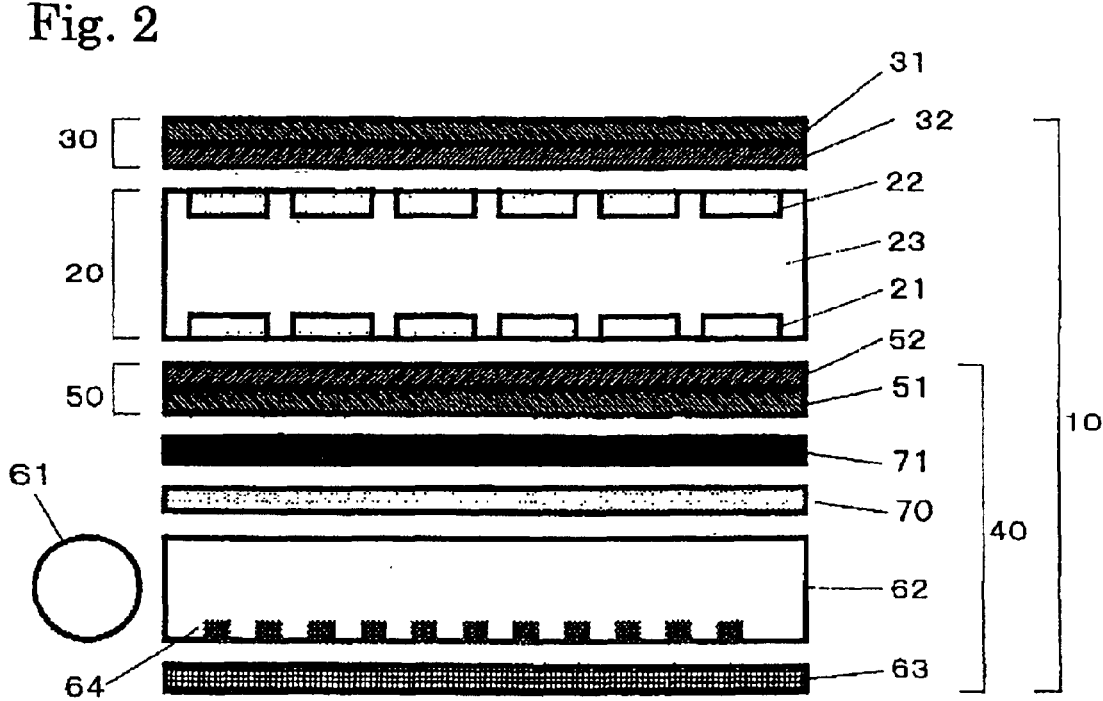
FIG. 2 is a typical sectional view showing an example of a conventional liquid crystal display.

A polarizer in the present invention comprises a reflection type polarizer and a dichroic polarizer. The reflection type polarizer and the dichroic polarizer are placed so that polarizing transmission axes thereof are coincident with each other on the same optical path. The dichroic polarizer has i) a transmittance [T(AP)(λ)] of about 44% or more and a polarizing coefficient [P(AP)(λ)] of about 50.0% or more, or ii) a luminous correction transmittance [Y(AP)] of about 44% or more and a luminous correction polarizing coefficient [P(AP, y)] of about 50.0% or more.

The reflection type polarizer in the present invention serves to transmit polarized light having vibration in a specific direction and to reflect polarized light having vibration orthogonal thereto. Examples of the reflection type polarizer include a reflection type polarizer utilizing a difference in a reflectance of a polarizing component due to an angle of polarization (for example, Published Japanese Translation of PCT International Application (PCT-JP) No. Hei 6-508449-A), a reflection type polarizer utilizing a selective reflection characteristic by a cholesteric liquid crystal (for example, Japanese Laid-Open Patent Publication (JP) No. Hei 3-45906-A), a reflection type polarizer forming a fine metal wire-shaped pattern (for example, JP No. Hei 2-308106-A), a reflection type polarizer comprising two kinds of polymer films to utilize a reflectance anisotropy due to a refractive index anisotropy (for example, PCT-JP No. Hei 9-506837-A), a reflection type polarizer consisting of continuous polymer matrix with droplets dispersed therein to utilize a reflectance anisotropy due to a refractive index anisotropy (for example, U.S. Pat. No. 5,825,543), a reflection type polarizer having particles distributed in a polymer film to utilize a reflectance anisotropy due to a refractive index anisotropy (for example, PCT-JP No. Hei 11-509014-A), a reflection type polarizer having inorganic particles distributed in a polymer film to utilize a reflectance anisotropy due to a difference in scattering property depending on a size (for example, JP No. Hei 9-297204-A) and the like.

A thickness of the reflection type polarizer is not particularly restricted. When the polarizer in the present invention is used for a liquid crystal display or the like, it is preferred that the reflection type polarizer is thin and the thickness thereof is preferably about 1 mm or less, more preferably about 0.2 mm or less.

In order to reduce the thickness of polarizer in the present invention, it is preferred to utilize a reflection type polarizer (comprising a film of cholesteric liquid crystal and a quaerter wavelength film) which utilizes a selective reflection characteristic by a cholesteric liquid crystal, a reflection type polarizer (multi-layered element) comprising two kinds of polymer films to utilize a reflectance anisotropy due to a refractive index anisotropy, a reflection type polarizer (polymer film consisting of continuous polymer matrix with droplets dispersed therein) which is made from two kinds of polymers to utilize a reflectance anisotropy due to a refractive index anisotropy.

A transmittance [T(RP)(λ)] for a light having a wavelength λ of the reflection type polarizer is represented by an equation (1) using a maximum transmittance [T(RP, T)(λ)] for a polarized light in a specific direction of vibration and a transmittance [T(RP, E)(λ)] for a polarized light orthogonal to the polarized light in the specific direction of vibration.

$$T(RP)(\lambda) = \{T(RP,T)(\lambda) + T(RP,E)(\lambda)\}/2 \qquad (1)$$

Furthermore, a parallel transmittance [T(RP, //)(λ)] and an orthogonal transmittance [T(RP, ⊥)(λ)] of the reflection type polarizer are represented by equations (2a) and (2b), respectively.

$$T(RP,//)(\lambda) = [\{T(RP,T)(\lambda)\}^2 + \{T(RP,E)(\lambda)\}^2]/2 \qquad (2a)$$

$$T(RP,\perp)(\lambda) = T(RP,T)(\lambda) \times T(RP,E)(\lambda) \qquad (2b)$$

For each of these transmittances, a stimulation value Y in a C light source 2° visual field is also calculated in accordance with JIS Z-8701 to obtain a luminous correction transmittance [Y(RP)], a luminous correction parallel transmittance [Y(RP, //)], and a luminous correction orthogonal transmittance[Y(RP, ⊥)], respectively. By using the luminous correction transmittances, a luminous correction polarizing coefficient [P(RP, y)] is calculated from an equation (3).

$$P(RP,y) = [\{Y(RP,//) - Y(RP,\perp)\}/\{Y(RP,//) + Y(RP,\perp)\}]^{1/2} \qquad (3)$$

A dichroic polarizer in the present invention serves to rectilinearly transmit a polarized light having vibration in a specific direction and to absorb a polarized light orthogonal thereto. Examples of the dichroic polarizer include a well-known iodine-based polarizing film and a well-known dye-based polarizing film. The iodine-based polarizing film is obtained by allowing iodine to be adsorbed into an extended polyvinyl alcohol film, and the dye-based polarizing film is obtained by allowing a dichromatic dye to be adsorbed into an extended polyvinyl alcohol film. It is preferred that these polarizing films have one side thereof or both sides thereof coated with (a) plastic film(s) in order to protect the polarizing films and enhance their durability. For the coating, a plastic material such as diacetic acid cellulose, triacetic acid cellulose, polyethylene terephthalate and a norbornane resin can be used. A thickness of the dichroic polarizer is not particularly restricted. When the polarizer in the present invention is used for a liquid crystal display or the like, it is preferred that the polarizer is thin and the thickness thereof is preferably about 1 mm or less, more preferably about 0.2 mm or less.

A transmittance [T(AP)(λ)] for a light having a wavelength λ of the dichroic polarizer is represented by an equation (4) using a maximum transmittance [T(AP, T)(λ)] for polarized light in a specific direction of vibration and a transmittance [T(AP, E) (λ)] for a polarized light orthogonal to the polarized light in the specific direction of vibration.

$$T(AP)(\lambda) = \{T(AP,T)(\lambda) + T(AP,E)(\lambda)\}/2 \qquad (4)$$

Furthermore, a parallel transmittance [T(AP, //)(λ)] and a orthogonal transmittance [T(AP, ⊥)(λ)] in the dichroic polarizer are represented by equations (5a) and (5b), respectively.

$$T(AP,//)(\lambda) = [\{T(AP,T)(\lambda)\}^2 + \{T(AP,E)(\lambda)\}^2]/2 \qquad (5a)$$

$$T(AP,\perp)(\lambda) = T(AP,T)(\lambda) \times T(AP,E)(\lambda) \qquad (5b)$$

For each of these transmittances, a stimulation value Y in a C light source 2° visual field is also calculated in accordance with the JIS Z-8701 to obtain a luminous correction transmittance [Y(AP)], a luminous correction parallel transmittance [Y(AP, //)], and a luminous correction orthogonal transmittance [Y(AP, ⊥)], respectively. By using the luminous correction transmittances, a luminous correction polarizing coefficient [P(AP, y)] is calculated from an equation (6).

$$P(AP,y)=[\{Y(AP,//)-Y(AP,\perp)\}/\{Y(AP,//)+Y(AP,\perp)\}]^{1/2} \quad (6)$$

The polarizer in the present invention has the reflection type polarizer and the dichroic polarizer, each of which is placed so that polarizing transmission axes thereof are coincident with each other on the same optical path. The polarizing transmission axis in the present invention indicates a direction of polarizing elements in the polarizer of which transmittance is maximized by rotation thereof when a polarized light in a specific direction of vibration enters into the polarizer in a vertical direction of the polarizer. It is preferred that the reflection type polarizer and the dichroic polarizer come in close contact with each other through a pressure sensitive adhesive. The pressure sensitive adhesive is not particularly restricted and may be a well-known adhesive. Most preferably, an acrylate based pressure sensitive adhesive is used.

The polarizer, which is obtained by allowing the reflection type polarizer and the dichroic polarizer to come in close contact with each other through the pressure sensitive adhesive, is one of the preferred embodiments of the present invention. A transmittance [T(P)(λ)] for a light having a wavelength λ of such a preferred polarizer is represented by an equation (7) using a maximum transmittance [T(P, T)(λ)] for polarized light in a specific direction of vibration and a transmittance [T(P, E)(λ)] for polarized light orthogonal to the polarized light in the specific direction of vibration.

$$T(P)(\lambda)=\{T(P,T)(\lambda)+T(P,E)(\lambda)\}/2 \quad (7)$$

Furthermore, a parallel transmittance [T(P, //)(λ)] and an orthogonal transmittance [T(P,⊥)(λ)] of the polarizer are represented by equations (8a) and (8b), respectively.

$$T(P,//)(\lambda)=[\{T(P,T)(\lambda)\}^2+\{T(P,E)(\lambda)\}^2]/2 \quad (8a)$$

$$T(P,\perp)(\lambda)=T(P,T)(\lambda)\times T(P,E)(\lambda) \quad (8b)$$

For each of these transmittances, a stimulation value Y in a C light source 2° visual field is also calculated in accordance with the JIS Z-8701 to obtain a luminous correction transmittance [Y(P)], a luminous correction parallel transmittance [Y(P, //)], and a luminous correction orthogonal transmittance [Y(P, ⊥)], respectively. By using the luminous correction transmittances, a luminous correction polarizing coefficient [P(P, y)] is calculated from an equation (9).

$$P(P,y)=[\{Y(P,//)-Y(P,\perp)\}/\{Y(P,//)+Y(P,\perp)\}]^{1/2} \quad (9)$$

The dichroic polarizer used in the polarizer in the present invention has a transmittance [T(AP)(λ)] of about 44% or more and a polarizing coefficient [P(AP)(λ)] of about 50.0% or more in at least a certain specific wavelength λ. The upper limit of the transmittance is 100% and the upper limit of the polarizing coefficient is also 100%. The larger transmittance [T(AP)(λ)] is preferred. Specifically, the transmittance [T(AP)(λ)] is preferably about 45% or more, while the upper limit thereof is 100%. The larger polarizing coefficient [P(AP)(λ)] is also preferred. Specifically, the polarizing coefficient [P(AP)(λ)] is preferably about 80.0% or more, more preferably about 90% or more, and most preferably about 95.0% or more, while the upper limit thereof is 100%.

For multicolor display in a liquid crystal display or the like, the dichroic polarizer which has a luminous correction transmittance [Y(AP)] of about 44% or more and a luminous correction polarizing coefficient [P(AP, y)] of about 50.0% or more is preferably used in the polarizer of the present invention. The upper limit of the luminous correction transmittance is 100% and the upper limit of the luminous correction polarizing coefficient is also 100%. The larger luminous correction transmittance [Y(AP)] is preferred. Specifically, the luminous correction transmittance [Y(AP)] is preferably about 45% or more, while the upper limit thereof is 100%. The larger luminous correction polarizing coefficient [P(AP, y)] is also preferred. Specifically, the luminous correction polarizing coefficient [P(AP, y)] is preferably about 80.0% or more, more preferably about 90% or more and most preferably about 95.0% or more, while the upper limit thereof is 100%.

One of the preferred polarizer of the present invention, which is obtained by allowing the reflection type polarizer and the dichroic polarizer to come in close contact with each other through the pressure sensitive adhesive, preferably has a luminous correction transmittance [Y(P)] of about 42% or more. Also, the polarizer preferably has a luminous correction polarizing coefficient [P(P, y)] of about 80% or more, more preferably of about 90% or more, much more preferably about 99% or more, and most preferably of about 99.9% or more, while the upper limit thereof is 100%.

One of embodiments of polarizing light source devices in the present invention comprises, in the following order, (I) one of the polarizer comprising the reflection type polarizer and dichroic polarizer, (II) a light source and (III) a reflector, wherein the light source (II) and the reflector (III) are placed over the side of surface of the reflection type polarizer in the polarizer (I). The polarizing light source device preferably further comprises at least one diffusion sheet between the reflection type polarizer and the light source.

Another embodiment of the polarizing light source devices in the present invention comprises, in the following order, (I) one of the polarizer comprising the reflection type polarizer and dichroic polarizer, (II)' a light transmitting plate having a light source provided on its end and (III) a reflector, wherein the light transmitting plate (II)' and the reflector (III) are placed over the side of surface of the reflection type polarizer in the polarizer (I). The polarizing light source device preferably further comprises at least one diffusion sheet between the reflection type polarizer and the light transmitting plate. Moreover, it is more preferred that the polarizing light source device comprises at least one lens sheet between the reflection type polarizer and the diffusion sheet and/or between the diffusion sheet and the light transmitting plate.

The light source in the present invention is not particularly restricted, and light sources utilized in a polarizing light source device and a liquid crystal display, which are well known, can be used. Examples of the light source include a cold cathode tube, a light emitting diode, an inorganic or organic EL lamp and the like.

The reflector in the present invention is not particularly restricted, and reflector plates utilized in the polarizing light source device and the liquid crystal display, which are well known, can be used. Examples of the reflector include a white plastic sheet having a cavity formed therein, a plastic sheet having a surface coated with titanium oxide or a white pigment such as zinc white, a multi-layered plastic sheet provided with two or more kinds of plastic films having different refractive indices, a metal sheet such as aluminum sheet or silver sheet and the like. The sheets subjected to mirror finishing or roughing process can be used. A material for the above-described plastic sheet is not particularly restricted. Examples of the material for the plastic sheet include polyethylene, polypropylene, polyvinyl chloride, polyethylene terephthalate, polyethylene naphthalate, polycarbonate, norbornane, polyurethane, polyacrylate, polymethyl methacrylate and the like.

The light transmitting plate in the present invention serves to fetch light emitted from the light source into an inner portion thereof and functions as a plate-shaped luminous illuminant, and a well-known light transmitting plate can be used.

The light transmitting plate may comprise a plastic sheet or a glass plate which is subjected to a concavo-convex process, a white dot printing process, a hologram process or the like on its surface. A material for the plastic sheet is not particularly restricted. Preferred material examples of the plastic sheet for the light transmitting plate include polycarbonate, norbornane, polymethyl methacrylate and the like.

The diffusion sheet used in the present invention serves to scatter and transmit incident light, and may be an optical element having a full ray transmittance of about 60% or more and a haze value of about 10% or more. The higher full ray transmittance is preferred. Specifically, the full ray transmittance is preferably about 80% or more, and more preferably 85% or more.

Such a diffusion sheet is not particularly restricted. Examples of the diffusion sheet include a plastic sheet or a glass plate which is subjected to a roughing process or has a cavity in an inner portion thereof or has particles added into an inner portion thereof. A material for the plastic sheet for the diffusion sheet is not particularly restricted. Examples of the material for the plastic sheet include polyethylene, polypropylene, polyvinyl chloride, polyethylene terephthalate, polyethylene naphthalate, polycarbonate, norbornane, polyurethane, polyacrylate, polymethyl methacrylate and the like. A method of the roughing process is not particularly restricted. For example, the roughing process can be carried out in a method in which a sand blasting or an emboss roll is used to press the plastic sheet, or a method in which a surface of a plastic sheet is coated with a resin having plastic particles, glass particles, silicon particles or the like mixed therewith.

The lens sheet used in the present invention serves to collect light emitted from a light source and a well-known lens sheet can be used.

Examples of the lens sheet include a plastic sheet having a large number of fine prisms formed thereon and a micro lens array formed with convex lenses or concave lenses.

One of embodiments of liquid crystal displays in the present invention comprises, in the following order, a polarizing light source device obtained in accordance with the present invention, a liquid crystal cell and another dichroic polarizer, wherein the liquid crystal cell and the dichroic polarizer are placed over the side of the dichroic polarizer used in the polarizing light source device. It is preferred that the liquid crystal display further comprises a pressure sensitive adhesive between the polarizing light source device and the liquid crystal and/or between the liquid crystal cell and the dichroic polarizer to be bonded to each in order to reduce a loss of light due to unnecessary reflection on an interface. The pressure sensitive adhesive is not particularly restricted, and a well-known adhesive can be used. An acrylate-based pressure sensitive adhesive is most preferably used. An embodiment of the liquid crystal display in accordance with the present invention is shown in FIG. 1.

The liquid crystal cell used in the present invention may be obtained by injecting a liquid crystal into a cell and serves to change the orientation state of the liquid crystal through application of a voltage, thereby varying the state of polarized light transmitting through the cell. Examples of the liquid crystal include a TN (twist nematic) liquid crystal cell, a TFT (thin film transistor) driving TN liquid crystal cell, an In-Plane nematic liquid crystal cell, a VA (vertical orientation) nematic liquid crystal cell, an STN (supertwist nematic) liquid crystal cell and the like, which may be well-known.

By using the polarizer in the present invention, a brighter picture plane can be obtained than that in the conventional art even with the same consumed electricity. This means that the electricity consumption for obtaining the same luminance of the picture plane as that obtained in the conventional art can be reduced. Therefore, the liquid crystal display comprising the polarizer can be used for a long period of time with one-time battery charging. Alternatively, the capacity of the battery installed in the liquid crystal display can be decreased so that the liquid crystal display can be decreased in size and weight.

The polarizer, the polarizing light source device and the liquid crystal display in the present invention is described in Japanese application no. 11-350244, filed Dec. 9, 1999, the complete disclosures of which are incorporated herein by reference.

EXAMPLE

The present invention is described in more detail by following Examples and Comparative Examples, which should not be construed as a limitation upon the scope of the present invention.

Evaluations in Examples and Comparative Examples are conducted as follows.

(1) Haze value

A reflection type polarizer or a dichroic polarizer to be measured was cut into a portion of 5 cm square and the portion was bonded onto a glass substrate having a thickness of 1.1 mm through a pressure sensitive adhesive. A haze value of the portion was measured by using a haze computer HGM-2DP (manufactured by Suga Testing Machine Co., Ltd.).

(2) Transmittance and Polarizing Coefficient

It was found that the reflection type polarizer and the dichroic polarizer which were used in the following Examples and Comparative Examples have small haze value. Therefore, transmittance and polarizing coefficient of the reflection type polarizer, the dichroic polarizer and a polarizer comprising the reflection type polarizer and the dichroic polarizer were measured with rectilinear transmitting spectral measurement using a spectrophotometer. Specifically, the measurements were conducted as follows. A Nicol prism was provided in a measuring light emitting place in a sample room of Shimadzu automatic recording spectrophotometer UV-2200 (manufactured by Shimadzu Corporation) so that polarized light having vibration in a specific direction is emitted. The reflection type polarizer, the dichroic polarizer or the polarizer comprising the reflection type polarizer and the dichroic polarizing was respectively bonded onto a glass substrate through a pressure sensitive adhesive and was then used for measurements of a transmittance and polarizing coefficient thereof.

A transmittance and polarizing coefficient of the polarizer was measured as follows. The polarizer (to be measured) with the glass substrate was arranged in the spectrophotometer so that polarized light enters vertically to the polarizer as well as in a direction such that the transmittance of the polarized light is maximized. The transmittance measurement was carried out in an incidence wavelength of from 400 nm to 700 nm at a pitch of 10 nm, to obtain a transmittance of the polarizer along the polarizing transmission axis thereof at each wavelength. Next, the polarizer with the glass substrate was rotated at an angle of 90° and then transmittance measurement was carried out again in an incidence wavelength of from 400 nm to 700 nm at a pitch of 10 nm, to obtain a transmittance of the polarizer along an orthogonal axis of the polarizing transmission axis at each wavelength. Using thus-measured transmittances, the polarizing coefficient of the polarizer was calculated.

(3) Luminous Correction Transmittance and Luminous Correction Polarizing Coefficient By using the transmittance and the polarizing coefficient in each wavelength obtained in the method described above, a stimulation value Y in a C-light-source 20 visual field was calculated in accordance with JIS Z8701 to obtain a luminous correction transmittance and a luminous correction polarizing coefficient, respectively.

(4) Hue

By using the transmittance in each wavelength obtained in the method described above, a non-luminous object color (L*, a*, b*) was calculated in accordance with the JIS Z8729. Hue was evaluated with the obtained non-luminous object color (L*, a*, b*).

(5) Luminance Improvement

Figure 3:
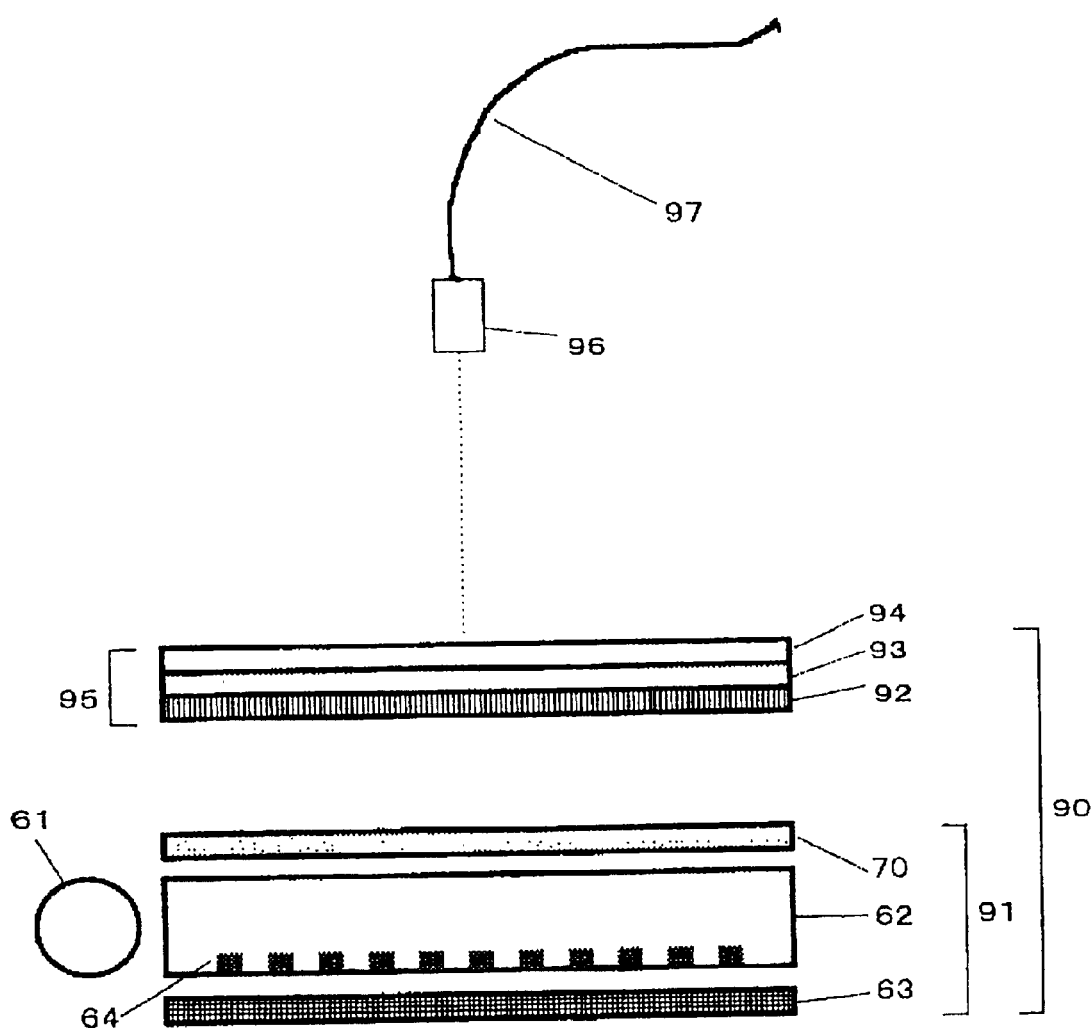
FIG. 3 is a typical sectional view showing an evaluating device in Examples.

As shown in FIG. 3, alight source device (91) was obtained by placing a reflector (63) made of foaming PET and a diffusion sheet (70) over each side of a light transmitting plate (62) which had a light source (61) comprising a cold cathode tube placed on its end and a white dot print (64) provided on one side thereof. Specifically, the placement was conducted so that the reflector (63) faced a side provide with the dot print of the plate (62) and the diffusion sheet (70) faced the other side of the plate (62). A unit (95) was obtained by placing a polarizer (92) comprising a dichroic polarizer and a reflection type polarizer over a glass substrate (94) having a thickness of 1.1 mm through a pressure sensitive adhesive (93) so that the dichroic polarizer in the polarizer (92) faced the glass substrate (94). Then, a polarizing light source device (90) was obtained by placing the unit (95) over the light source device (91) as illustrated in FIG. 3.

In a direction vertical to the surface of the obtained polarizing light source device (90), was provided a light measuring portion (96) connected with a light receiving portion of a spectrophotometer through an optical fiber (97).

Bright-line spectra corresponding to "blue", "green" and "red" of the cold cathode tube (61) used as a light source for the polarizing light source device (90) had maximum absorbance at 435 nm, 545 nm and 612 nm, respectively. At each of the wavelengths, a light receiving intensity of the polarizing light source device (90) was measured to evaluate a luminance improvement which the polarizer (92) therein shows. The luminance improvement was evaluated at each of the wavelengths with a ratio of the light receiving intensity to that of a standard unit. The standard unit was obtained in the same manner as described above except that, instead of using the polarizer (92) comprising the dichroic polarizer and the reflection type polarizer, a dichroic polarizer SK1832A (manufactured by Sumitomo Chemical Co., Ltd.) was used.

(6) Picture Plane Contrast

On one side of the polarizing light source device (90) used for evaluating the luminance improvement, was provided a dichroic polarizer SK1832A so that a polarized light transmission axis thereof is orthogonal to the polarized light transmission axis of the polarizing light source. On the other side of the polarizing light source device (90), was provided another dichroic polarizer SK1832A so that the polarized light transmission axis thereof is parallel to the polarized light transmission axis of the polarizing light source. Using the device thus obtained, picture plane contrast of the polarizer (92) comprising the dichroic polarizer and the reflection type polarizer was evaluated by visual observation. The results are shown in three stages in that "very high contrast", "high contrast" and "low contrast" were shown respectively as "grade A", "grade B" and "grade C".

(7) Dichroic Polarizer

For dichroic polarizers in Examples and Comparative Examples, were utilized commercially available iodine-based polarizing films SK1832A and SR1862A (manufactured by Sumitomo Chemical Co., Ltd.) and an iodine-based polarizers A, B and C, each of which transmittance and polarizing coefficient was controlled. Concerning each of these dichroic polarizers, Table 1 shows haze value, Table 2 shows transmittance and polarizing coefficient at 430 nm, 540 nm and 610 nm, and Table 3 shows luminous correction transmittance, a luminous correction polarizing coefficient and hue.

(8) Reflection Type Polarizer

In Examples and Comparative Examples, were utilized a commercially available reflection type polarizer DBEF (manufactured by Sumitomo Three M Co., Ltd.) that is a multi-layered element comprising two kinds of polymer films. The haze value, the transmittance and polarizing coefficient at 430 nm, 540 nm and 610 nm, the luminous correction transmittance and luminous correction polarizing coefficient and hue of the reflection type polarizer are shown in Tables 1, 2 and 3.

TABLE 1

| | Haze value (%) |
|---|---|
| Dichroic polarizer A | 0.6 |
| Dichroic polarizer B | 0.2 |
| Dichroic polarizer C | 0.4 |
| Dichroic polarizer SK1832A | 0.2 |
| Dichroic polarizer SR1862A | 0.2 |
| Reflection type polarizer DBEF | 1.6 |

TABLE 2

| | Transmittance (%) | | | Polarizing Coefficient (%) | | |
|---|---|---|---|---|---|---|
| | 430 nm | 540 nm | 610 nm | 430 nm | 540 nm | 610 nm |
| Dichroic polarizer A | 41.7 | 44.5 | 44.4 | 97.5 | 99.0 | 99.6 |
| Dichroic polarizer B | 43.3 | 45.5 | 45.1 | 93.9 | 96.7 | 98.5 |

TABLE 2-continued

|  | Transmittance (%) | | | Polarizing Coefficient (%) | | |
| --- | --- | --- | --- | --- | --- | --- |
|  | 430 nm | 540 nm | 610 nm | 430 nm | 540 nm | 610 nm |
| Dichroic polarizer C | 45.4 | 47.6 | 47.1 | 87.7 | 89.3 | 91.4 |
| Dichroic polarizer SK1832A | 37.3 | 41.4 | 40.6 | 99.9 | 100.0 | 100.0 |
| Dichroic polarizer SR1862A | 39.6 | 43.5 | 43.5 | 99.8 | 99.9 | 100.0 |
| Reflection type polarizer DBEF | 43.5 | 45.9 | 46.2 | 96.5 | 90.0 | 89.4 |

TABLE 3

|  | Luminous correction transmittance (%) | Luminous correction polarizing coefficient (%) | Hue | | |
| --- | --- | --- | --- | --- | --- |
|  |  |  | L* | a* | b* |
| Dichroic polarizer A | 44.4 | 99.1 | 72.5 | −1.2 | 2.1 |
| Dichroic polarizer B | 45.4 | 97.2 | 73.1 | −1.3 | 1.6 |
| Dichroic polarizer C | 47.3 | 90.2 | 74.4 | −1.1 | 1.8 |
| Dichroic polarizer SK1832A | 41.0 | 100.0 | 70.2 | −2.1 | 2.6 |
| Dichroic polarizer SR1862A | 43.4 | 99.9 | 71.8 | −1.6 | 3.0 |
| Reflection type polarizer DBEF | 44.8 | 94.7 | 72.7 | 1.3 | −1.8 |

Examples 1 to 3

The dichroic polarizer A was placed over the reflection type polarizer DBEF to obtain a polarizer in Example 1. In the same manner, polarizers were obtained using the dichroic polarizers B (in Example 2) and C (in Example 3), respectively, instead of the dichroic polarizer A. Luminance improvement (that is the light receiving intensity ratio) and picture plane contrast of each of these polarizers were evaluated. The results are shown in Table 4.

Comparative Examples 1 and 2

In the same manner as in Example 1, polarizers were obtained using the dichroic polarizers SK1832A (in Comparative Example 1) and SR1862A (in Comparative Example 2) respectively, instead of the dichroic polarizer A. Luminance improvement (that is the light receiving intensity ratio) and picture plane contrast of each of these polarizers were evaluated. The results are shown in Table 4.

TABLE 4

|  | Luminance improvement | | | Picture plane contrast |
| --- | --- | --- | --- | --- |
|  | 435 nm | 545 nm | 612 nm |  |
| Example 1 | 1.43 | 1.51 | 1.54 | Grade A |
| Example 2 | 1.47 | 1.54 | 1.59 | Grade A |
| Example 3 | 1.51 | 1.56 | 1.59 | Grade B |
| Comparative Example 1 | 1.27 | 1.38 | 1.39 | Grade A |
| Comparative Example 2 | 1.37 | 1.49 | 1.53 | Grade A |

Examples 4 to 6

The dichroic polarizer A was bonded to the reflection type polarizer DBEF through an acrylate based pressure sensitive adhesive to obtain a polarizer in Example 4. In the same manner, polarizers were obtained using the dichroic polarizers B (in Example 5) and C (in Example 6), respectively, instead of the dichroic polarizer A.

The transmittance and polarizing coefficient at 430 nm, 540 nm and 610 nm, the luminous correction transmittance, luminous correction polarizing coefficient and hue of each of the obtained polarizers are shown in Tables 5 and 6.

Luminance improvement (that is the light receiving intensity ratio) and picture plane contrast of each polarizer were evaluated. The results are shown in Table 7.

Comparative Examples 3 and 4

In the same manner as in Example 4, polarizers were obtained using the dichroic polarizers SK1832A (in Comparative Example 3) and SR1862A (in Comparative Example 4), respectively, instead of the dichroic polarizer A. The transmittance and polarizing coefficient at 430 nm, 540 nm and 610 nm, the luminous correction transmittance luminous correction polarizing coefficient and hue of the each of obtained polarizers are shown in Tables 5 and 6.

Luminance improvement (that is the light receiving intensity ratio) and picture plane contrast of each of the obtained polarizer were evaluated. The results are shown in Table 7.

TABLE 5

|  | Transmittance (%) | | | Polarizing coefficient (%) | | |
| --- | --- | --- | --- | --- | --- | --- |
|  | 430 nm | 540 nm | 610 nm | 430 nm | 540 nm | 610 nm |
| Example 4 | 39.2 | 42.4 | 42.7 | 99.7 | 99.9 | 100.0 |
| Example 5 | 39.7 | 42.5 | 42.9 | 99.3 | 99.9 | 99.9 |
| Example 6 | 39.9 | 42.9 | 42.8 | 99.6 | 99.4 | 99.7 |
| Comparative Example 3 | 34.6 | 38.6 | 38.5 | 100.0 | 100.0 | 100.0 |
| Comparative Example 4 | 36.9 | 40.4 | 41.3 | 100.0 | 100.0 | 100.0 |

TABLE 6

|  | Luminous correction transmittance (%) | Luminous correction polarizing coefficient (%) | Hue | | |
| --- | --- | --- | --- | --- | --- |
|  |  |  | L* | a* | b* |
| Example 4 | 42.3 | 99.9 | 71.1 | −1.2 | 2.6 |
| Example 5 | 42.5 | 99.9 | 71.2 | −1.0 | 4.2 |
| Example 6 | 42.6 | 99.5 | 71.3 | −0.9 | 2.1 |
| Comparative Example 3 | 38.5 | 100.0 | 68.4 | −1.9 | 2.9 |
| Comparative Example 4 | 41.0 | 100.0 | 70.2 | −1.3 | 3.3 |

TABLE 6-continued

|  | Luminous correction transmittance (%) | Luminous correction polarizing coefficient (%) | Hue L* | a* | b* |
|---|---|---|---|---|---|
| Example 4 | | | | | |

TABLE 7

|  | Luminance improvement | | | Picture plane contrast |
|---|---|---|---|---|
|  | 435 nm | 545 nm | 612 nm | |
| Example 4 | 1.51 | 1.57 | 1.62 | Grade A |
| Example 5 | 1.53 | 1.57 | 1.62 | Grade A |
| Example 6 | 1.54 | 1.57 | 1.63 | Grade B |
| Comparative Example 3 | 1.33 | 1.43 | 1.44 | Grade A |
| Comparative Example 4 | 1.43 | 1.52 | 1.56 | Grade A |

As shown in Tables 4 to 7, a polarizer comprising a dichroic polarizer having a higher transmittance shows a larger luminance improvement and a higher transmittance (as in Examples 1 to 6) than those of a polarizer comprising a dichroic polarizer having a lower transmittance (as in Comparative Examples 1 to 4). In addition, a polarizer obtained by allowing a reflection type polarizer and a dichroic polarizer to come in close contact with each other through a pressure sensitive adhesive has much higher luminance improvement (as in Examples 4 to 6) than that of a polarizer having no pressure sensitive adhesive between the reflection type polarizer and the dichroic polarizer (as in Examples 1 to 3). It means that a polarizing light source device having such a polarizer comprising the reflection type polarizer, a dichroic polarizer and the pressure sensitive adhesive therebetween shows higher brightness than that of a polarizing light source device having the polarizer with no pressure sensitive adhesive between the reflection type polarizer and the dichroic polarizer.

What is claimed is:

1. A polarizer comprising a reflection type polarizer and a dichroic polarizer, each of which is placed so that polarizing transmission axes of said reflection type polarizer and said dichroic polarizer are coincident with each other on the same optical path, wherein the dichroic polarizer has a transmittance [T(AP)(λ)] of about 44% or more and a polarizing coefficient [P(AP)(λ)] of about 97% or more, and the polarizer has a luminous correction polarizing coefficient [P(P,Y)] of 99.9% or more.

2. A polarizer comprising a reflection type polarizer and a dichroic polarizer, each of which is placed so that polarizing transmission axes of said reflection type polarizer and said dichroic polarizer are coincident with each other on the same optical path, wherein the dichroic polarizer has a luminous correction transmittance [Y(AP)] of about 44% or more and a luminous correction polarizing coefficient [P(AP, y)] of about 95% or more, and the polarizer has a luminous correction polarizing coefficient [P(P,Y)] of 99.9% or more.

3. The polarizer according to claim 1 or 2, wherein the dichroic polarizer is an iodine-based polarizing film.

4. The polarizer according to claim 1 or 2, wherein the dichroic polarizer is a dye-based polarizing film.

5. The polarizer according to claim 1 or 2, wherein the reflection type polarizer is a multi-layered element comprising two or more kinds of polymer films.

6. The polarizer according to claim 1 or 2, wherein the reflection type polarizer is a polymer film consisting of a continuous polymer matrix with droplets dispersed therein, wherein said polymer film is made from two or more kinds of polymers.

7. The polarizer according to claim 1 or 2, wherein the reflection type polarizer is a polarizer comprising a film having a cholesteric liquid crystal and a quarter wavelength film.

8. The polarizer according to claim 1 or 2, wherein the reflection type polarizer and the dichroic polarizer are bonded to each other through a pressure sensitive adhesive.

9. The polarizer according to claim 1 or 2, wherein the reflection type polarizer and the dichroic polarizer are bonded to each other through a pressure sensitive adhesive to obtain said polarizer having a luminous correction transmittance [Y(P)] of 42% or more.

10. A polarizing light source device comprising, in the following order,
   (I) the polarizer comprising a reflection type polarizer and a dichroic polarizer, each of which is placed so that polarizing transmission axes of said reflection type polarizer and said dichroic polarizer are coincident with each other on the same optical path, wherein said dichroic polarizer has
      i) a transmittance [T(AP)(λ)] of about 44% or more and a polarizing coefficient [P(AP)(λ)] of about 97% or more, or
      ii) a luminous correction transmittance [Y(AP)] of about 44% or more and a luminous correction polarizing coefficient [P(AP, y)] of about 95% or more,
   (II) a light source and
   (III) a reflector,
wherein the light source (II) and the reflector (III) are placed over the side of a surface of the reflection type polarizer in the polarizer (I).

11. The polarizing light source device according to claim 10, wherein said device further comprises at least one diffusion sheet between the reflection type polarizer and the light source.

12. A polarizing light source device comprising, in the following order,
   (I) the polarizer comprising a reflection type polarizer and a dichroic polarizer, each of which is placed so that polarizing transmission axes of said reflection type polarizer and said dichroic polarizer are coincident with each other on the same optical path, wherein said dichroic polarizer has
      i) a transmittance [T(AP)(λ)] of about 44% or more and a polarizing coefficient [P(AP)(λ)] of about 97% or more, or
      ii) a luminous correction transmittance [Y(AP)] of about 44% or more and a luminous correction polarizing coefficient [P(AP, y)] of about 95% or more,
   (II) a light transmitting plate having a light source provided on its end and
   (III) a reflector,
wherein the light transmitting plate (II) and the reflector (III) are placed over the side of a surface of the reflection type polarizer in the polarizer (I).

13. The polarizing light source device according to claim 12, wherein said device further comprises at least one diffusion sheet between the reflection type polarizer and the light transmitting plate.

14. The polarizing light source device according to claim 13, wherein said device further comprises at least one lens sheet between the reflection type polarizer and the diffusion sheet and/or between the diffusion sheet and the light transmitting plate.

15. A liquid crystal display comprising, in the following order, a polarizing light source device according to claim 10 or 12, a liquid crystal cell and another dichroic polarizer, wherein the liquid crystal cell and said another dichroic polarizer are placed over the side of a surface of the dichroic polarizer used in the polarizing light source device.

16. The liquid crystal display according to claim 15, wherein the polarizing light source device and the liquid crystal cell are bonded to each other through a pressure sensitive adhesive.

17. The liquid crystal display according to claim 15, wherein the liquid crystal cell and the dichroic polarizer are bonded to each other through a pressure sensitive adhesive.

* * * * *